(12) United States Patent
Bresson et al.

(10) Patent No.: US 12,723,458 B2
(45) Date of Patent: Sep. 1, 2026

(54) WIRELESS POWER FOR DOOR OPERATOR SYSTEM ACCESSORIES

(71) Applicant: ASSA ABLOY Entrance Systems AB, Landskrona (SE)

(72) Inventors: David P. Bresson, Pfafftown, NC (US); Neil Edwards, Kernersville, NC (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 18/944,608

(22) Filed: Nov. 12, 2024

(65) Prior Publication Data

US 2026/0132667 A1 May 14, 2026

(51) Int. Cl.

*E05F 15/668* (2015.01)
*H02J 7/35* (2006.01)
*H02J 50/00* (2016.01)
*H02J 50/20* (2016.01)
*H02J 50/90* (2016.01)

(52) U.S. Cl.

CPC .............. *E05F 15/668* (2015.01); *H02J 7/35* (2013.01); *H02J 50/001* (2020.01); *H02J 50/20* (2016.02); *H02J 50/90* (2016.02); *E05Y 2400/614* (2013.01); *E05Y 2900/106* (2013.01)

(58) Field of Classification Search

CPC .......... H02J 50/001; H02J 50/20; H02J 50/90; E05F 15/00

See application file for complete search history.

(56) References Cited

U.S. PATENT DOCUMENTS

2003/0063715 A1 4/2003 Peplinski
2005/0250543 A1* 11/2005 Thermond ........... H04B 7/0617 455/562.1
2006/0281435 A1* 12/2006 Shearer .............. G06K 19/0702 455/343.1
2008/0186129 A1* 8/2008 Fitzgibbon ............ H02J 50/402 340/5.2
2014/0340240 A1 11/2014 Becker et al.
2015/0171658 A1 6/2015 Manova-Elssibony et al.
2015/0256082 A1* 9/2015 Gudan ................ H02J 7/00308 320/108
2016/0099614 A1 4/2016 Leabman et al.
2019/0393736 A1* 12/2019 Moghaddam ....... H02J 7/00034

(Continued)

OTHER PUBLICATIONS

Search Report and Written Opinion from corresponding International Application No. PCT/EP2025/082669, mailed Mar. 3, 2026, all pages cited in its entirety.

*Primary Examiner* — Rexford N Barnie
*Assistant Examiner* — Joseph N Inge
(74) *Attorney, Agent, or Firm* — Burr & Forman

(57) ABSTRACT

A system comprising a sectional door, an opener operably coupled to the sectional door to move the sectional door via a roller assembly operably coupling the sectional door to a rail assembly to enable the sectional door to transition between an open state and a closed state via the roller assembly carrying the sectional door in the rail assembly, and a plurality of accessories associated with monitoring or movement of the sectional door. The accessories may include at least one powered device having a rechargeable battery and a radio frequency to direct current (RF-DC) converter operably coupled to the rechargeable battery to charge the rechargeable battery based on conversion of energy harvested RF transmissions into DC power.

15 Claims, 7 Drawing Sheets

(56) References Cited

U.S. PATENT DOCUMENTS

| | | | | |
|---|---|---|---|---|
| 2023/0030439 | A1* | 2/2023 | Yehezkely | G06K 19/0709 |
| 2023/0087532 | A1 | 3/2023 | Bodurka | |
| 2023/0108988 | A1 | 4/2023 | Learmonth et al. | |
| 2025/0215736 | A1* | 7/2025 | Farooqui | E05F 15/43 |

* cited by examiner

WIRELESS POWER FOR DOOR OPERATOR SYSTEM ACCESSORIES

TECHNICAL FIELD

Example embodiments generally relate to control and monitoring of movable doors, such as garage doors, industrial doors, and the like, and in particular, relate to a system where accessories of the system can be powered wirelessly.

BACKGROUND

Moveable sectional doors, such as garage doors, industrial doors and the like, have been around for a very long time, and have been adapting into more complicated and capable systems. In this regard, for example, connectivity of various devices has further enabled many functional capabilities for garage door opener (GDO) and other door operator systems that improve the operation of the systems and the satisfaction of users. The additional devices that have been connected to the door operator systems to improve performance include various sensors, lights, displays, locks, remote controls, cameras, etc. These additional devices are typically referred to as accessories, and have become very much in demand for modern door operator systems.

Whereas the functions enabled by these accessories are both popular and in demand, the motivation to include them often drives people to be willing to endure complicated setup, or engage in extra efforts to keep such accessories powered. In this regard, for example, when not powered by wired connection, the accessories may draw power from batteries that are either replaceable or rechargeable. The user may therefore be required to replace the batteries or collect them for separate recharging. Unless the user employs a program of routine maintenance, which certainly adds to the user's workload, the system may be degraded in function when the batteries are exhausted and the corresponding accessories cease to function to thereby inform the user of the need for replacement or recharging.

Accordingly, it may be desirable to define a system that does not suffer from the limitations described above. In this regard, for example, it may be preferable to develop a system in which the accessories can continue to function without any need for the user to take an active role in recharging or replacing batteries.

BRIEF SUMMARY OF SOME EXAMPLES

In an example embodiment, a door operator system may be provided. The system may include a sectional door, an opener operably coupled to the sectional door to move the sectional door via a roller assembly operably coupling the sectional door to a rail assembly to enable the sectional door to transition between an open state and a closed state via the roller assembly carrying the sectional door in the rail assembly, and a plurality of accessories associated with monitoring or movement of the sectional door. The accessories may include at least one powered device having a rechargeable battery and a radio frequency to direct current (RF-DC) converter operably coupled to the rechargeable battery to charge the rechargeable battery based on conversion of energy harvested RF transmissions into DC power.

In another example embodiment, an RF-DC converter for an accessory of a door operator system that includes a sectional door and an opener operably coupled to the sectional door to move the sectional door may be provided. The RF-DC converter may include an antenna to receive RF transmissions, and an AC-DC converter operably coupled to a rechargeable battery of the accessory to charge the rechargeable battery based on conversion of the received RF transmissions into DC power.

In yet another example embodiment, an on-door accessory for a door operator system that includes a sectional door and an opener operably coupled to the sectional door to move the sectional door may be provided. The on-door accessory may include a rechargeable battery, and an RF-DC converter operably coupled to the rechargeable battery to charge the rechargeable battery based on conversion of energy harvested RF transmissions into DC power.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
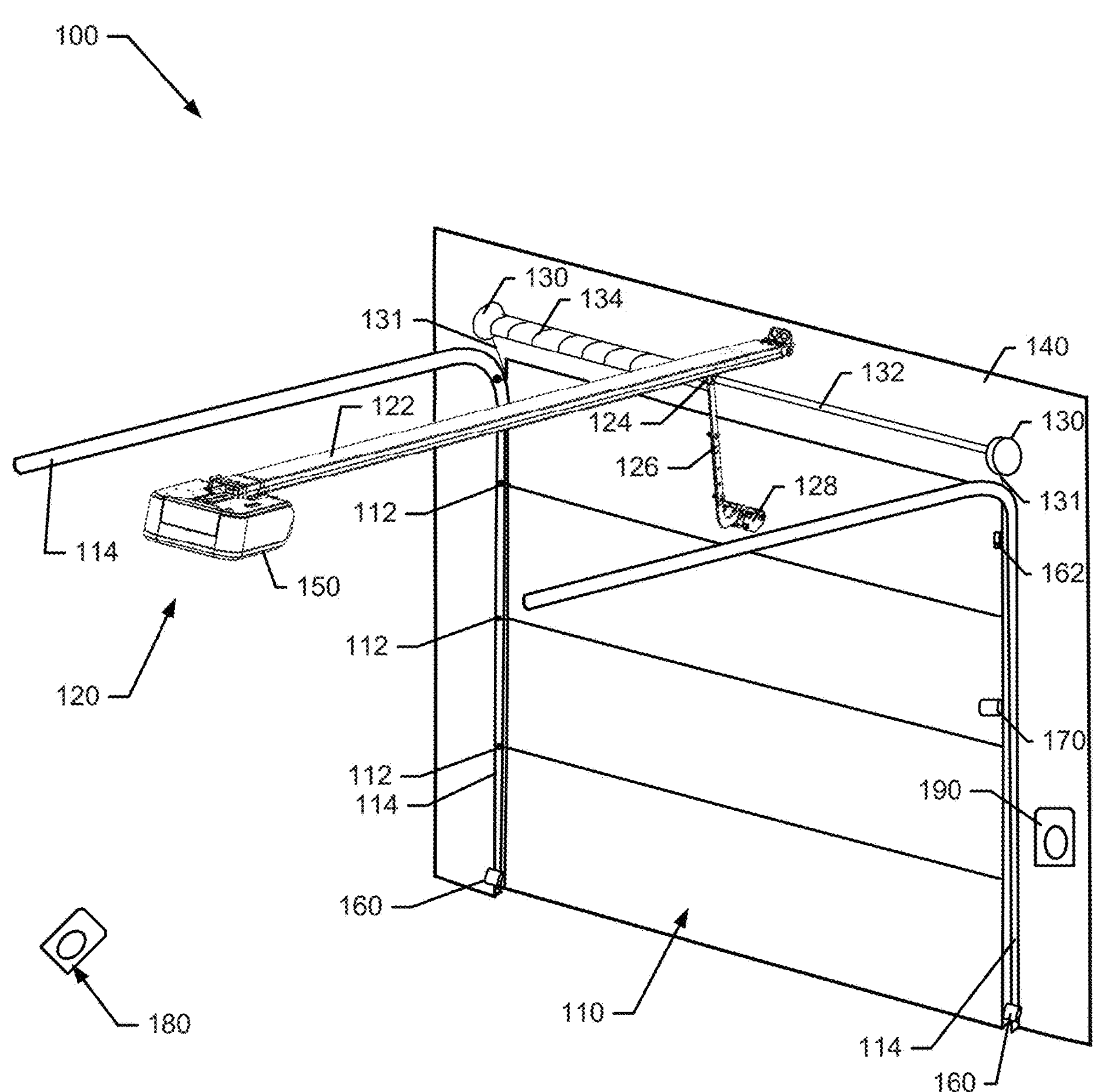
FIG. 1 illustrates a perspective view of a GDO system in a ceiling mounted or trolley in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, example embodiments are aimed at eliminating a need for the user to engage in continued maintenance operations in order to keep accessories powered when the accessories are not connected to the system via wired connections. To accomplish this, example embodiments may employ rechargeable batteries on the accessories, but further include a radio frequency (RF) to direct current (DC) converter onboard the accessories to charge the batteries.

FIG. 1 illustrates a garage door operator (GDO) system 100 of an example embodiment. In this regard, FIG. 1 shows the GDO system 100 in a trolley (or ceiling mounted) configuration, but it should be understood that example embodiments may also apply to situations in which the GDO system 100 is in a jackshaft configuration. In both cases, the GDO system 100 includes a sectional door 110, in which each section of the door has rollers 112 operably coupled to opposing lateral sides of the sections. The rollers 112 are typically rotatably operably coupled to the sectional door 110 via brackets that rotatably support a shaft of the rollers 112 and enable a wheel to extend into and ride within rails 114 disposed on opposing sides of the sectional door 110 as the sectional door 110 transitions between open and closed positions. The sectional door 110 of FIG. 1 is shown in the closed position, where the rollers 112 are in a vertical section of the rails 114. Thus, it can be appreciated that in the open position the rollers 112 are located in a horizontally extending portion of the rails 114, and the sectional door 110 is carried into parallel with the ground as opposed to its condition of being perpendicular to the ground in the closed position shown in FIG. 1. Each section of the sectional door 110 can pivot relative to any adjacent section at an intersection thereof in order to enable the sectional door 110 to traverse the bend that separates the horizontally extending portion of the rails 114 from the vertically extending portion of the rails 114.

FIG. 1 also illustrates a GDO unit referred to as an opener 120 or motorhead. The opener 120 of this example is shown in the trolley configuration in which a guide rail 122 may extend parallel to and approximately midway between the horizontally extending portion of the rails 114 on opposing lateral sides of the sectional door 110. The opener 120 may be mounted (e.g., from the ceiling) proximate to an end of the guide rail 122 to drive a trolley 124 along the guide rail 122 via a flexible member such as a belt, cable or chain. The belt, cable or chain may also be operably coupled (e.g., via the trolley 124) to a top portion of the sectional door 110 by an engaging arm 126 and engaging bracket 128 that is attached to the sectional door 110. As noted above, the trolley 124 may be manually released from the sectional door 110 to allow for manual repositioning of the sectional door 110.

In some cases, the sectional door 110 may also be supported by one or more instances of cables 131 that are alternately wound onto and off of one or more cable drums 130 disposed at or near opposing ends of a tube 132 (sometimes called a drive tube). The cables 131 may be attached to a bottom portion of the sectional door 110 to assist in carrying the weight of the sectional door 110. The tube 132 may further support a spring assembly 134 that facilitates, along with the cables 131, supporting the weight of the sectional door 110 during opening and closing operations of the sectional door 110 using the opener 120. The sectional door 110, when closed, may block an opening provided in a front wall 140 of the garage in which the GDO system 100 is installed. The opening may be left open when the sectional door 110 is raised onto the horizontally extending portions of the rails 114. As can be seen in FIG. 1, the guide rail 122 may be secured to the front wall 140 at a proximal end of the guide rail 122, and the opener 120 may be suspended from the ceiling of the garage at a distal end of the guide rail 122.

The sectional door 110 is, as noted above, often comprised of panels of aluminum, steel, fiberglass, plastic, or other relatively lightweight, but otherwise structurally rigid material of any suitable type. In some cases, one or more of the panels of the sectional door 110 may include or be comprised of a glass or film that may be transparent or translucent to allow natural light to pass therethrough and into the garage. Moreover, it should be understood that the GDO system 100 of FIG. 1 is merely an example of a door operator system in which example embodiments may be practiced. Industrial doors and other movable doors may also employ example embodiments.

The GDO system 100 of FIG. 1, and any other door operator system, may further include a number of accessories, as noted above. The accessories may include, for example, a light 150. The light 150 of this example happens to be located at the opener 120. However, the light 150 may alternatively be located at another portion of the garage and, in some cases, may be removable from its location at and connection with the opener 120, and may be positionable at another location in the garage. Particularly when located remotely from the opener, the advantage of having the light 150 be powered by a battery may become more apparent. Nevertheless, regardless of where the light 150 is located, battery power, and the advantages described herein relative to charging the battery may be employed. The light 150 may be for illumination or for indicating various states or conditions of the GDO system 100. Moreover, the light 150 may be or include a light emitting diode (LED) or an incandescent light, among other potential illumination or indication options.

Other accessories that may be included in the GDO system 100 may include various sensors such as, for example, an obstacle sensor 160 that detects when an obstacle is located in the opening, which my interfere with the ability to close the sectional door 110. Another sensor that may be included in the GDO system 100 may include a door position sensor 162, which may detect the position of the sectional door 110 (e.g., open/closed, or defining a percentage of open/closed). Other sensors may also be included such as, for example, speed sensors, temperature sensors (e.g., thermometers), force sensors, motion sensors, visual sensors (e.g., a camera), and/or the like.

The GDO system 100 may also include a lock 170, which may be located on or next to the sectional door 110 and in some cases proximate to the rails 114 in order to, when actuated or activated, prevent the roller 112 from transiting in the rails 114 or otherwise inhibit or prevent movement of the sectional door 110. In some cases, the lock 170 may include a pin that extends into a lock receiver that may be located on the sectional door 110, one or both of the rails 114, the front wall 140, or any other surface or component such that when the pin is extended into the lock receiver, the sectional door 110 is effectively fixed in its location and unable to move relative to the rails 114.

Other accessories of the GDO system 100 may include one or more instances of a controller, which may include a movable (remote) controller 180 and a fixed controller 190, which may be mounted on a wall or at the opener 120. Notably, although the fixed controller 190 of FIG. 1 is located at the front wall, the fixed controller 190 may alternatively be located at a back wall or any sidewall of the garage (or other location in which the operator system is employed). The movable controller 180 may be located in a vehicle, or may be carried by the user, or otherwise be movable and usable when within range of the opener 120 to wirelessly instruct the opener 120 to operate to open or close the sectional door 110. The fixed controller 190 and/or the movable controller 180 may include a simple button or other actuator to operate the opener 120. However, in other examples, the fixed controller 190 and/or movable controller 180 may include a display (e.g., touch screen display) or other more complicated user interface to enable control of the opener 120 in addition to other functions associated with operation, monitoring or control of the GDO system 100.

Figure 2:
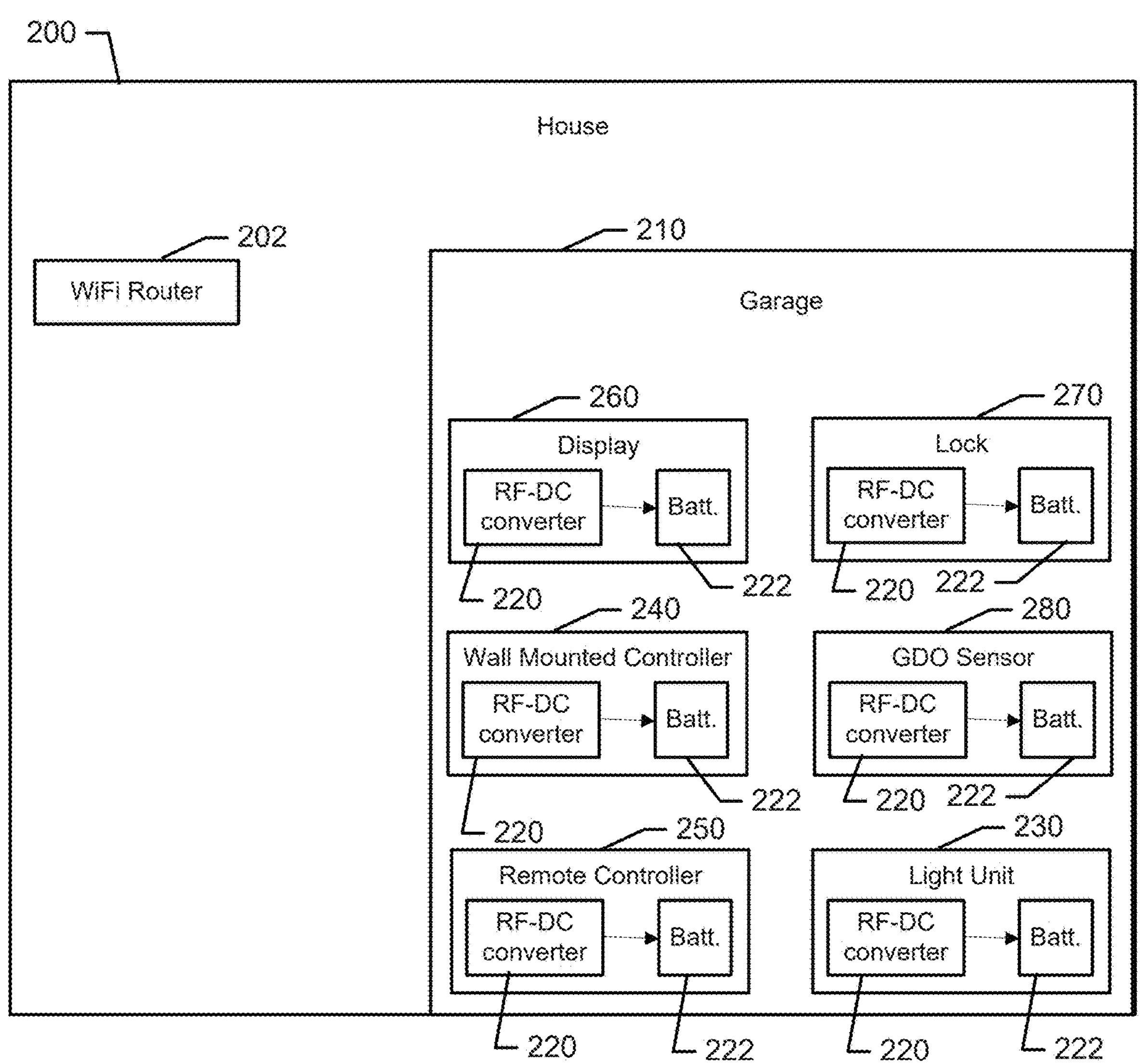
FIG. 2 illustrates a block diagram of a wireless accessory charging system that uses passive and opportunistic RF transmission conversion in accordance with an example embodiment.

As noted above, to the extent any of the accessories of the GDO system 100 are powered with a local battery, it may be desirable to avoid continued manual efforts to recharge or replace the battery. To accomplish this example embodiments may employ energy harvesting that may charge local batteries free of any need for manual interaction by the users. FIG. 2 illustrates one particular structure via which energy harvesting may be exploited in this context.

Turning to FIG. 2, it should be appreciated that many houses today are separately equipped with wireless transmission devices that nearly continuously emit (or are capable of emitting) wireless RF signals. In this regard, for example, an example of a house 200 is shown in FIG. 2, and the house 200 includes a WiFi router 202. The WiFi router 202 may be a typical wireless local area network (WLAN) transmitter that provides internet access to connected devices via digital communication exchange wirelessly. Thus, the WiFi router 202 may be understood to be an example of a wireless access point that employs the IEEE 802.11 protocol standards for wireless connectivity, and operates within the unlicensed communication bands of 2.4 GHz and 5 GHz. However, it should be understood that other forms of transmitter may be used for the functions described herein, and thus the WiFi router 202 is merely one non-limiting example.

The WiFi router 202 of many households may actually be connected to the GDO system 100 to improve functionality, control and/or monitoring. Thus, it is common for the transmissions of the WiFi router 202 to be strong enough to reach not only the fixed controller 190 or opener 120, for example, but any or all of the other accessories of the GDO system 100, which may be located in a garage 210 of the house 200. However, as noted above, the garage 210 is merely one example space in which example embodiments may be practiced. Other locations may also include door operators with accessories powered as described herein. Moreover, transmissions in the same frequency range are emitted from neighboring WiFi routers and many other devices. Accordingly, particularly in the 2.4 and 5 GHz frequency ranges, ample opportunities may exist to harvest energy from transmissions for local battery charging. However, other frequencies and bands of frequencies may also be harvested in some embodiments.

Example embodiments may provide an instance of an RF-DC converter 220 for connection to a battery 222 (e.g., a rechargeable battery) of each other one of the accessories of the GDO system 100 to perform energy harvesting. In some cases, the energy harvesting may be focused with respect to the transmissions of the WiFi router 202 (e.g., in the 2.4 and 5 GHz frequency ranges). However, as noted above, such harvesting may occur in other frequencies in some cases. Regardless of the specific frequency involved, the RF-DC converter 220 may convert RF transmissions received thereat into DC voltages for charging the battery 222. Even though the DC voltages that are obtainable through this method may be relatively small (e.g., m V level extractions), many of the accessories may only be required to operate periodically, and for relatively short periods of time. Thus, for example, even relatively low voltage trickle charging over nearly continuous time intervals may be sufficient over time to replenish the depletions that occur periodically for relatively short periods of time. Thus, for example, an instance of the battery 222 may be provided in each respective one of the accessories, and an instance of the RF-DC converter 220 may operate nearly continuously to charge the battery 222 as RF transmissions are opportunistically harvested by the RF-DC converter 220.

Although any number of different accessories may be powered in this way, FIG. 2 illustrates some examples. In this regard, light unit 230 may be located at the opener 120 or remotely therefrom, as noted above. The light unit 230 may include an instance of each of the battery 222 and the RF-DC converter 220. The light unit 230 may, for example, be an LED light in some cases. A wall mounted controller 240 and/or one or more instances of a remote controller 250 may also each include an instance of each of the battery 222 and the RF-DC converter 220. A display 250, which may be part of the wall mounted controller 240 in some cases, may also include an instance of each of the battery 222 and the RF-DC converter 220. A lock 270 may be one of the accessories that may also include an instance of each of the battery 222 and the RF-DC converter 220. Additionally, a GDO sensor 280 (e.g., an obstruction sensor, a door position sensor, or the like) may also be provided as one of the accessories that may include an instance of each of the battery 222 and the RF-DC converter 220. Any or all of the accessories may harvest RF transmissions most advantageously and reliably from the WiFi router 202 and devices communicating with the WiFi router 202 due to the ubiquity of such routers and the devices. However, other harvesting or harvesting in other frequencies may also be accomplished in some cases.

In some cases, an LED control panel that can be operated anywhere may be one of the accessories. In this regard, for example, the wall mounted controller 240 may be mobile instead of fixed. In some examples, a fixed repeater (e.g., a mounting station for the mobile controller) may be employed to increase signal strength of instructions sent from the mobile controller to other accessories and/or the opener 120, and thereby minimize power consumption of the mobile controller. Other accessories, including those outside the garage or other space to which the sectional door 110 controls access may also be included. For example, locks, cameras, safety devices, etc., that are associated with adjacent spaces or devices may also be powered using example embodiments.

Figure 3:
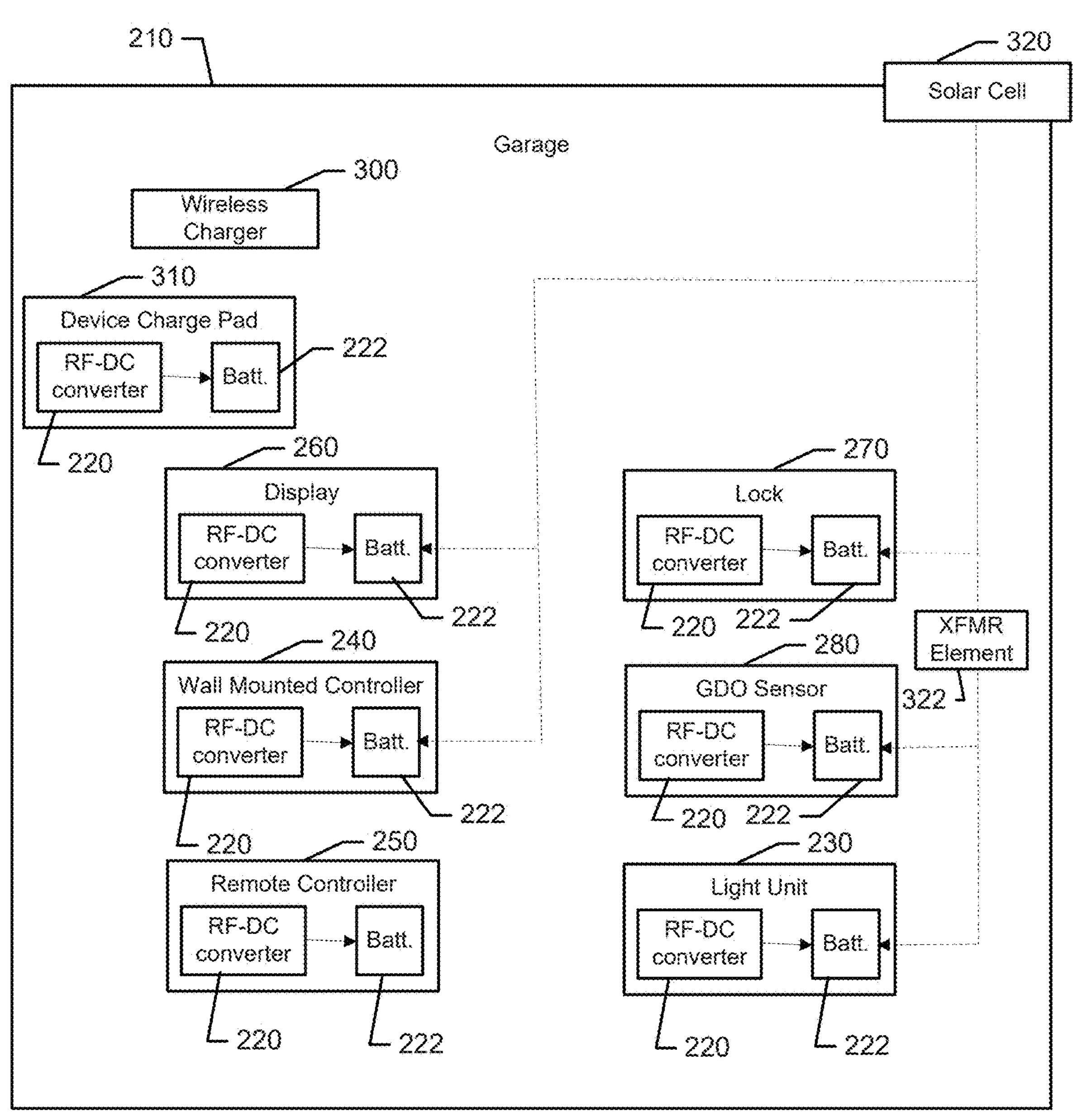
FIG. 3 illustrates a block diagram of a wireless accessory charging system that employs a transmitter purposefully designed to provide power wirelessly in accordance with an example embodiment.

The example of FIG. 2 describes a particular embodiment in which the energy harvesting is entirely opportunistic. In this regard, the RF-DC converter 220 is using RF transmissions that are not intended for or directed purposely at the RF-DC converter 220. However, some example embodiments may actually employ purposefully directed charging technologies. In this regard, for example, some example embodiments may employ a wireless charger 300 that produces RF transmissions that are specifically selected to interface with antennas of the RF-DC converter 220 and that may be powered (or even aimed in some cases) specifically with the intent of charging batteries operably coupled to the RF-DC converter 220. FIG. 3 illustrates such an example embodiment.

Turning now to FIG. 3, the wireless charger 300 may be understood to provide RF transmissions specifically for conversion by the RF-DC converter 220 to power the battery 222 of each respective one of the accessories. Thus, for example, the wireless charger 300 may employ higher powers and/or directed beams that may in either case (and potentially also in combination) provide higher conversion outputs for charging of the battery 222. Although the same accessories that were shown in FIG. 2 are also shown in FIG. 3, it should be appreciated that fewer, more or even different accessories may be included in some cases.

In an example embodiment, the wireless charger 300 may be installed by the user (or by professional installers) as a charging hot spot for the accessories. However, the wireless charger 300 may also be used to charge other devices that may be commonly found in the garage 210, but which may not necessarily be part of the GDO system 100. For example, the wireless charger 300 may also be used to charge a device charge pad 310, on which various power tools including garden, yard maintenance or other household or outdoor power equipment may be charged.

Of note, some of the accessories may be considered "on-door" accessories, since they are mounted on and generally move with the sectional door 110. On-door accessories may include motion sensors, speed sensors, force sensors, cameras, thermometers, locks, position sensors, etc. Thus, the GDO sensor 280 may be either an on-door or off-door sensor. A challenge is presented with respect to powering of on-door sensors, and that challenge is often simply not accepted by virtue of door manufacturers avoiding putting any sensors on the sectional door 110 itself. In this regard, since the sectional door 110 both moves, and has movable sections, the provision of wired power solutions on the sectional door 110 is extremely challenging or costly. Nevertheless, the value of having these sensors is compelling enough that many such sensors, often battery powered, are nevertheless finding their way into the market in large numbers. Battery replacement and charging therefore becomes a maintenance chore that many users come to dislike, and therefore the allure of wireless power provision for on-door sensors is particularly attractive. Example embodiments may enable these on-door sensors to be powered reliably and wirelessly, and may therefore ultimately enable maintenance-free and/or wire-free accessories, including on-door accessories.

In this regard, the use of the wireless charger 300 is generally useful for eliminating the need for wiring or other power sources to be used. However, particularly where a focus is provided on renewable energy harvesting, the accessories may also be charged via other sources including, for example, a solar cell 320 may be operably coupled (e.g., via wired connection) to some or all of the accessories that are fixed (i.e., not the remote controller 250). The solar cell 320 may be placed in a sunny place external to the garage 210 and may opportunistically provide charging power from the sun, which may augment the wireless charging of the wireless charger 300. For on-door accessories, the problem of door motion may be addressed, for example, via a transformer element 322, which may in some examples include a primary coil mounted proximate to a portion of the sectional door 110 (e.g., near one of the rails 114), and a secondary coil that is proximate to the primary coil when the sectional door 110 is in the closed position. Thus, while the door remains closed, which is most of the time for most GDO systems, power may be transferred from an off-door power source such as the solar cell 320 (or mains power or other alternatives) via the transformer element 322 to assist in recharging the battery 222 of each respective one of the accessories on-door. An on-door wiring network may be defined on the sectional door 110 to reach each of the on-door accessories, but no wired connection would extend from the on-door wiring network to any devices off-door.

Figure 4:
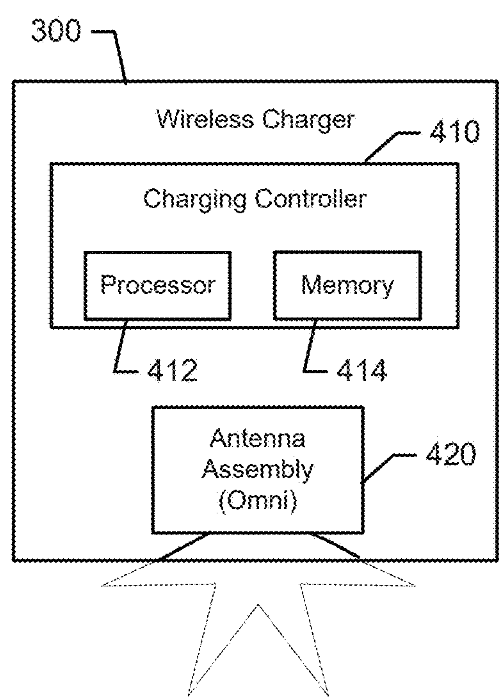
FIG. 4 is a block diagram of a wireless charger with an omnidirectional antenna according to an example embodiment.
Figure 4:
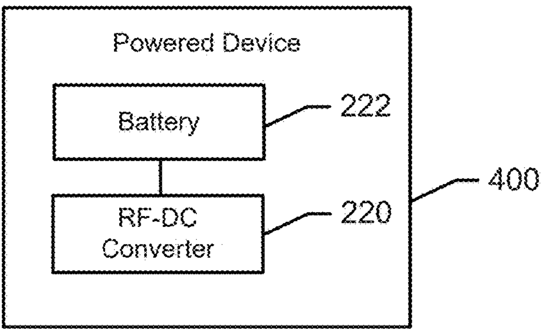

Turning more specifically to the operation of the wireless charger 300, FIG. 4 illustrates one architecture for providing remote charging to a powered device 400, which may be understood to be any one of the accessories of FIGS. 2 and 3, and therefore includes a corresponding instance of the RF-DC converter 220 and the battery 222. As shown in FIG. 4, the wireless charger 300 may include a charging controller 410 that further includes processing circuitry (e.g., a processor 412 and memory 414) for controlling an antenna assembly 420. In cases in which the antenna assembly 420 is omnidirectional (i.e., transmitting substantially equally in all directions or at least without any substantial focus in any particular direction), the charging controller 410 may be relatively simple and may, for example, only control a power level of the transmissions of the antenna assembly 420. However, in some cases, the charging controller 410 may be operable by the user (e.g., via local or remote control) to change frequency of transmission, power level of transmission, or the selection of multiple frequencies and power levels for transmission. For local control, a display with soft keys, or a relatively simple interface with dials, knobs, buttons and/or the like may be provided. For remote control, the user may communicate with the wireless charger 300 via an app on the smartphone or computer of the user to make various selections or settings changes through the app.

Figure 5:
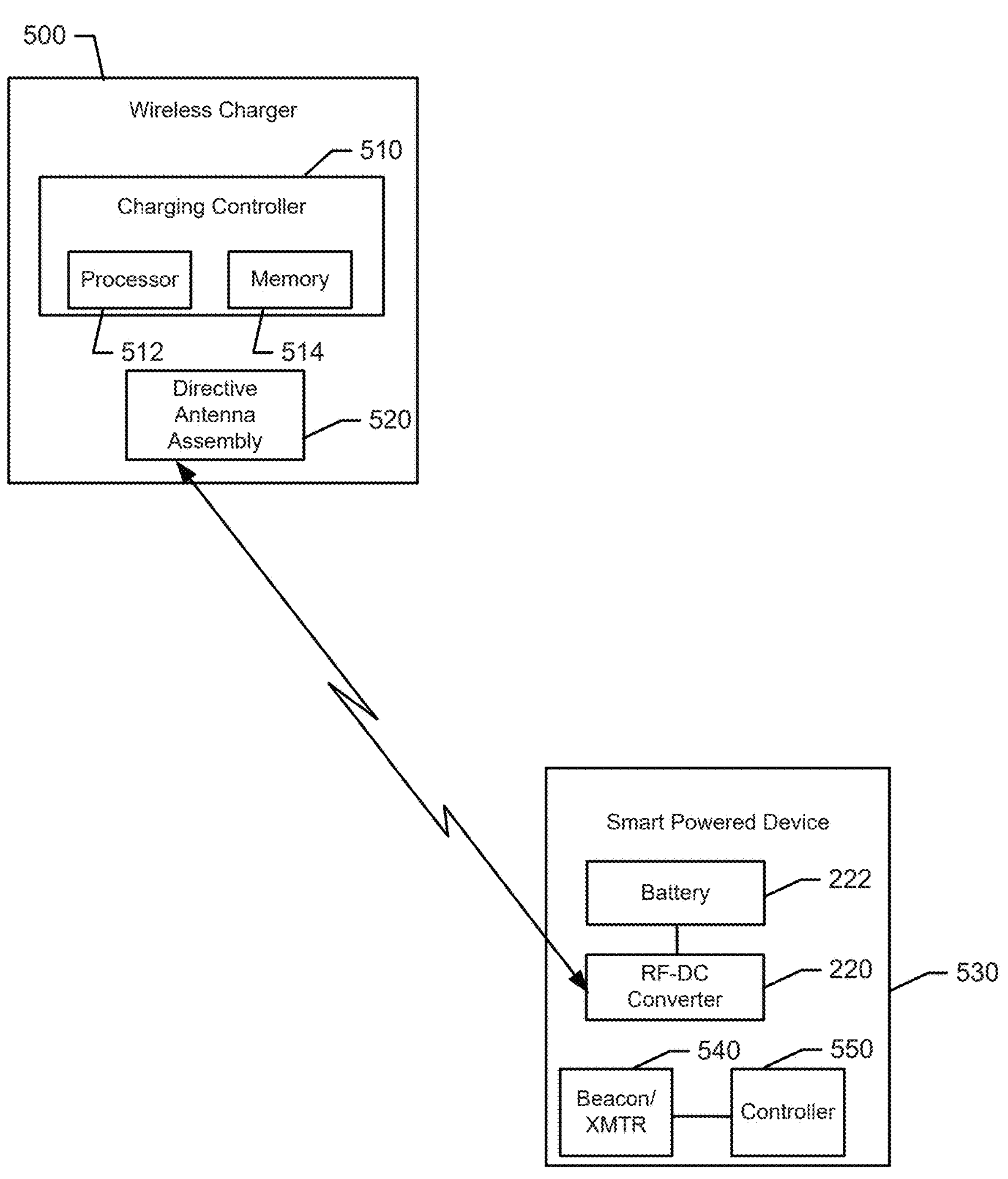
FIG. 5 illustrates a block diagram of a wireless charger with a directive antenna according to an example embodiment.

In other example embodiments, a more complex version of a wireless charger 500 may be employed, as shown in FIG. 5. In this regard, the wireless charger 500 may also include a charging controller 510 (e.g., potentially also including processing circuitry having a processor 512 and memory 514). However, in some example embodiments, the charging controller 510 may control a directive antenna assembly 520, which may interact with or charge an accessory with directed (or steered) beams of energy that target the accessory more specifically and therefore typically with higher power and efficiency. In this regard, the directive antenna assembly 520 may be automatically or manually controlled to transmit at a selected frequency and/or power, and the transmissions may also be directed to a particular direction. The direction may be relatively wide in some cases, to focus power generally in the direction of the accessories being powered (rather than wasting energy transmitting in all directions). However, in some embodiments, the direction may be specific to the location of the accessories. In this regard, the charging controller 510 may be configured to control the directive antenna assembly 520 to focus a relatively narrow beam (e.g., less than 10 or 20 degrees wide in azimuth and elevation, and sometimes less than that) toward the accessory. With narrower beams, higher power and greater energy transfer may be achieved.

Although the accessory may be a simple example of the powered device 400 in FIG. 4, in some cases, the accessory being powered may also be a smart powered device 530 as shown in FIG. 5. In FIG. 5, whereas the directive antenna assembly 520 can be aimed to transmit relatively narrow and focused beams or transmissions, the ability to do so may have even greater utility if the charging controller 510 knows the relative location of the smart powered device 530. To provide such knowledge, the smart powered device 530 may be configured to inform the charging controller 510 of the relative location of the smart powered device 530. In some cases, the smart powered device 530 may include a beacon or other transmitter 540 that can provide a signal detectable by the directive antenna assembly 520, which can further resolve the relative location from which the signal originated.

In some embodiments, the beacon or other transmitter 540 may be operated under the control of a controller 550 to transmit only during limited times to minimize power usage. For example, the controller 550 may limit transmissions to times during setup and discovery/location of the smart powered device 530 by the wireless charger 500. In this regard, for example, a local button or other actuator at the smart powered device 530 may be used to enter a setup mode during which the beacon or other transmitter 540 may transmit a discovery or beacon signal to the directive antenna assembly 520. The charging controller 510 may register the location (and sometimes profile information including an identity, tuned frequency of the RF-DC converter 220 or other parameters about the smart powered device 530) of the smart powered device 530. The charging controller 510 may save the location (and sometimes also the profile information in the memory 514) and may either continuously transmit to the RF-DC converter 220 or transmit according to a schedule defined and stored in the memory 514. However, in some cases, the controller 550 of the smart powered device 530 may also monitor the battery 222 to determine when energy levels in the battery 222 drop below a predefined threshold to trigger a call for charging by the controller 550. When triggered, the controller 550 may direct the beacon or other transmitter 540 to issue a charge request to the charging controller 510, and the charging controller 510 may direct a beam or other transmission at selected frequency and power levels to maximize charging for the battery 222.

Figure 6:
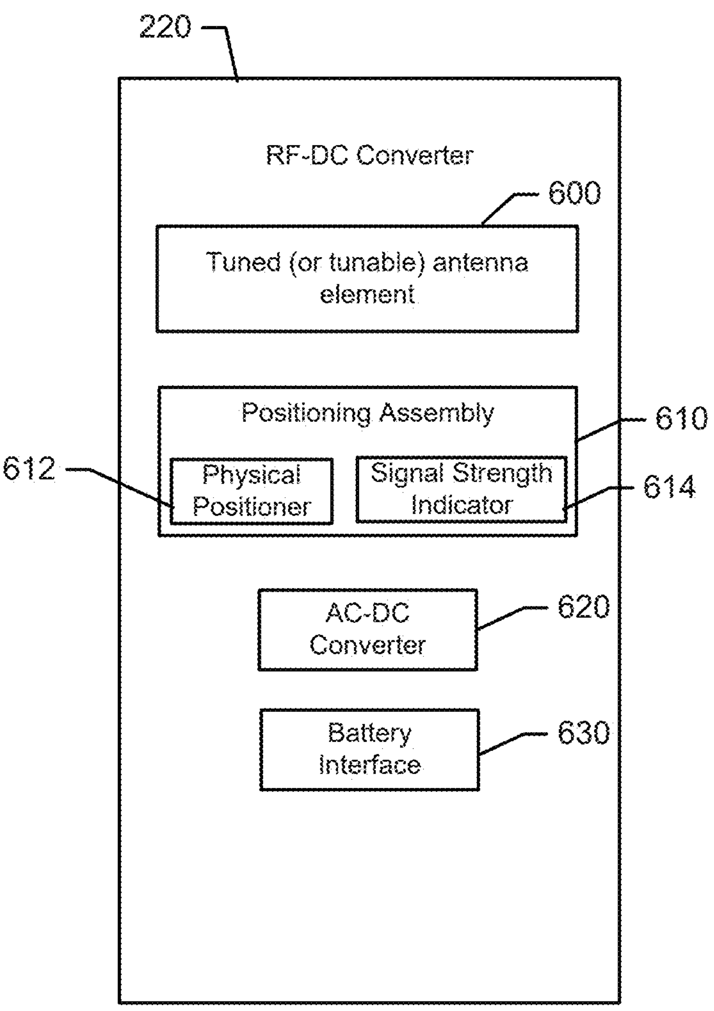
FIG. 6 illustrates a block diagram of an RF-DC converter according to an example embodiment.
Figure 7:
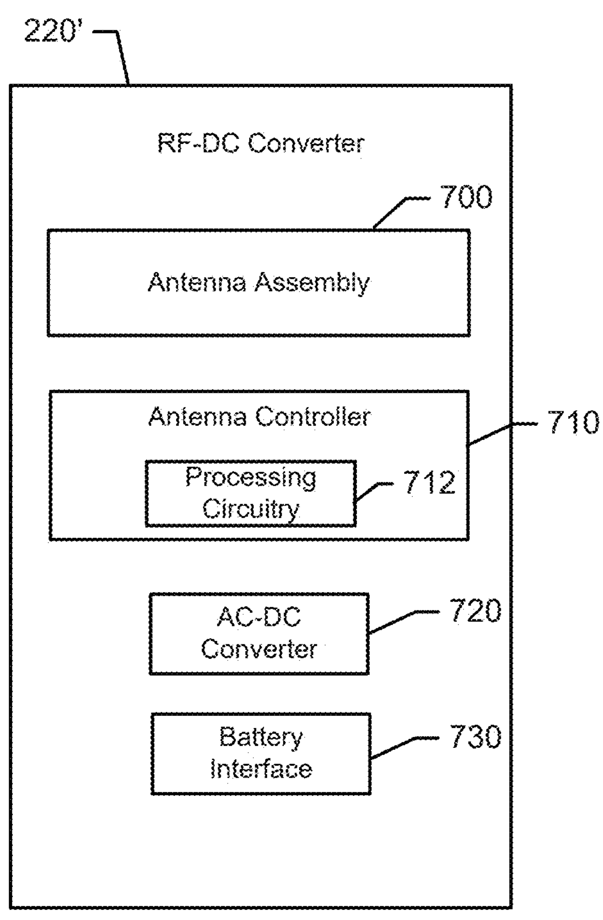
FIG. 7 illustrates a block diagram of an alternative RF-DC converter according to an example embodiment.

The RF-DC converter 220 may take numerous different forms in various example embodiments, but two general architectures are shown in FIGS. 6 and 7. Turning first to FIG. 6, the RF-DC converter 220 may include a tuned (or tunable) antenna element 600. The form factor of the tuned (or tunable) antenna element 600 may change, of course, depending on the frequency or frequencies that are to be harvested. For energy harvesting in the 2.4 and 5 GHZ ranges, good results may be achieved with an antenna size on the order of millimeters or centimeters in length and width. However, using micro-materials or nanomaterials and other electronic enhancements, even smaller antennas may be used in the future. In any case, the size and orientation of the antenna relative to the transmitter is important for determining the efficiency and power transfer possible. Thus, it may be helpful to enable some control over at least the orientation of the antenna in situ.

As implied by the name, the tuned (or tunable) antenna element 600 may either be tuned to receive (or be resonant at) a selected frequency, or may be capable of being tuned to a frequency or range of frequencies. Although not required, the RF-DC converter 220 may also include a positioning assembly 610. In some cases, the positioning assembly 610 may include a physical positioner 612, which may include a rotating or pivoting mount that enables the tuned (or tunable) antenna element 600 to be physically rotated or turned to maximize reception or efficiency of power transfer of the tuned (or tunable) antenna element 600 relative to the frequency or frequencies being transmitted for conversion to DC power. To facilitate finding the best orientation for reception, in some cases, the RF-DC converter 220 may include a signal strength indicator 614 to indicate signal strength to enable the user to maximize signal strength received. As the user orients the tuned (or tunable) antenna element 600 via the physical positioner 612, a number, color or intensity of lights, a volume of sound or other indications may change according to the signal strength being received, and may be monitored by the user to achieve the best possible result from the transmitter being targeted (e.g., the wireless charger 300 or the WiFi router 202). The output from the tuned (or tunable) antenna element 600 may then be provided to the AC-DC converter 620, which may include, for example, a rectifier to convert the AC of the RF transmissions received into a DC output for charging a battery. A battery interface 630 may therefore also be provided to operably couple the AC-DC converter 620 to the battery 222.

As an alternative to the embodiment of FIG. 7, an RF-DC converter 220' may instead include an antenna assembly 700 that is adaptive in frequency and/or orientation through electronic modification via an antenna controller 710. The antenna controller 710 may include processing circuitry 712 that enables the antenna controller 710 to define the frequency to which the antenna assembly 700 is to be tuned for reception and, in some cases, also the direction or orientation of the antenna assembly 700 if electronic steering is possible. In an example embodiment, the processing circuitry 712 may, at periodic intervals, be configured to do a frequency sweep over a range of frequencies detectable by the antenna assembly 700 and measure the signal strength at each significant frequency that can be detected. The antenna controller 710 may then determine which frequency has the strongest signal strength, and tune the antenna assembly 700 to the frequency with the strongest signal strength in order to maximize the output of AC-DC converter 720, which thereafter charges the battery 222 via the battery interface 730.

Accordingly, some example embodiments may provide a system that includes a sectional door, an opener operably coupled to the sectional door to move the sectional door via a roller assembly operably coupling the sectional door to a rail assembly to enable the sectional door to transition between an open state and a closed state via the roller assembly carrying the sectional door in the rail assembly, and a plurality of accessories associated with monitoring or movement of the sectional door. The accessories may include at least one powered device having a rechargeable battery and a radio frequency to direct current (RF-DC) converter operably coupled to the rechargeable battery to charge the rechargeable battery based on conversion of energy harvested RF transmissions into DC power.

The RF-DC converter and/or a system including the same, or components thereof described above may be augmented or modified by altering individual features mentioned above or adding optional features. The augmentations or optional features may be added in any combination of the examples listed below. In this regard, for example, the RF-DC converter may be tuned to convert WiFi frequencies from about 2.4 GHz to about 5 GHz into DC power for charging the rechargeable battery. In an example embodiment, the accessories may include a light, a sensor associated with the sectional door, a lock, or a controller of the opener. In some cases, the rechargeable battery of respective instances of the accessories may be additionally or alternatively rechargeable via a solar cell. In an example embodiment, the system may further include a wireless charger having an omnidirectional antenna assembly and a charging controller, and the charging controller may be configured to modify a frequency of transmission of the antenna assembly or a transmission power of the antenna assembly. In some cases, the system may further include a wireless charger having an directive antenna assembly and a charging controller, and the charging controller may be configured to modify a frequency of transmission of the antenna assembly or a transmission power of the antenna assembly. In an example embodiment, the at least one powered device may include a beacon or transmitter discoverable by the charging controller, and the charging controller may be configured to determine a relative location of the at least one powered device and direct RF transmissions toward the relative location of the at least one powered device. In some cases, the charging controller may determine a frequency of transmission for the antenna assembly based on information provided by the at least one powered device. In an example embodiment, the RF-DC converter may include a tunable antenna element and a positioning assembly, and the positioning assembly may include a physical positioner and a signal strength indicator. In some cases, the physical positioner may enable a user to pivot an orientation of the tunable antenna element to maximize a response indicated by the signal strength indicator. In an example embodiment, the RF-DC converter may include an antenna assembly operable under control of an antenna controller, and the antenna assembly may be adaptive in frequency or orientation through electronic modification via the antenna controller. In some cases, the antenna controller may include processing circuitry to define a frequency at which the antenna assembly is tuned for reception, and a direction or orientation of the antenna assembly may be electronic steered via the processing circuitry. In an example embodiment, the processing circuitry may be, at periodic intervals, configured to conduct a frequency sweep over a range of frequencies detectable by the antenna assembly and measure a signal strength a plurality of frequencies within the range, and the processing circuitry may determine a frequency having a strongest signal strength to tune the antenna assembly to the frequency having the strongest signal strength.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A door operator system comprising:

a sectional door;

an opener operably coupled to the sectional door to move the sectional door via a roller assembly operably coupling the sectional door to a rail assembly to enable the sectional door to transition between an open state and a closed state via the roller assembly carrying the sectional door in the rail assembly; and a plurality of accessories associated with monitoring or movement of the sectional door, wherein the accessories include at least one powered device having a rechargeable battery and a radio frequency to direct current (RF-DC) converter operably coupled to the rechargeable battery to charge the rechargeable battery based on conversion of energy harvested RF transmissions into DC power, wherein the RF-DC converter includes an antenna assembly operable under control of an antenna controller, wherein the antenna assembly is adaptive in frequency or orientation through electronic modification via the antenna controller, wherein the antenna controller comprises processing circuitry to define a frequency at which the antenna assembly is tuned for reception, and wherein a direction or orientation of the antenna assembly is electronically steered via the processing circuitry.

2. The system of claim 1, wherein the RF-DC converter is tuned to convert WiFi frequencies from about 2.4 GHz to about 5 GHz into DC power for charging the rechargeable battery.

3. The system of claim 1, wherein the plurality of accessories include a light, a sensor associated with the sectional door, a lock, or a controller of the opener.

4. The system of claim 3, wherein the rechargeable battery of respective instances of the plurality of accessories is additionally or alternatively rechargeable via a solar cell.

5. The system of claim 1, further comprising a wireless charger having an omnidirectional antenna assembly and a charging controller, wherein the charging controller is configured to modify a frequency of transmission of the antenna assembly or a transmission power of the antenna assembly.

6. The system of claim 1, further comprising a wireless charger having a directive antenna assembly and a charging controller, wherein the charging controller is configured to modify a frequency of transmission of the directive antenna assembly or a transmission power of the directive antenna assembly.

7. The system of claim 6, wherein the at least one powered device includes a beacon or transmitter discoverable by the charging controller, and wherein the charging controller is configured to determine a relative location of the at least one powered device and direct RF transmissions toward the relative location of the at least one powered device.

8. The system of claim 7, wherein the charging controller determines a frequency of transmission for the antenna assembly based on information provided by the at least one powered device.

9. The system of claim 1, wherein the RF-DC converter includes a tunable antenna element and a positioning assembly, and wherein the positioning assembly includes a physical positioner and a signal strength indicator.

10. The system of claim 9, wherein the physical positioner enables a user to pivot an orientation of the tunable antenna element to maximize a response indicated by the signal strength indicator.

11. The system of claim 1, wherein the processing circuitry is, at periodic intervals, configured to conduct a frequency sweep over a range of frequencies detectable by the antenna assembly and measure a signal strength a plurality of frequencies within the range, and wherein the processing circuitry determines a frequency having a strongest signal strength to tune the antenna assembly to the frequency having the strongest signal strength.

12. A radio frequency to direct current (RF-DC) converter for an accessory of a door operator system comprising a sectional door and an opener operably coupled to the sectional door to move the sectional door, the RF-DC converter comprising:

an antenna to receive RF transmissions; and an alternating current to direct current (AC-DC) converter operably coupled to a rechargeable battery of the accessory to charge the rechargeable battery based on conversion of the received RF transmissions into DC power, wherein the antenna and the AC-DC converter are located on a door panel of the sectional door, wherein the RF-DC converter further comprising an antenna controller, wherein the antenna comprises an antenna assembly operable under control of the antenna controller, wherein the antenna assembly is adaptive in frequency or orientation through electronic modification via the antenna controller, wherein the antenna controller comprises processing circuitry to define a frequency at which the antenna assembly is tuned for reception, and wherein a direction or orientation of the antenna assembly is electronically steered via the processing circuitry.

13. The RF-DC converter of claim 12, wherein the antenna comprises a tunable antenna element and a positioning assembly, and wherein the positioning assembly includes a physical positioner and a signal strength indicator.

14. The RF-DC converter of claim 13, wherein the physical positioner enables a user to pivot an orientation of the tunable antenna element to maximize a response indicated by the signal strength indicator.

15. The RF-DC converter of claim 12, wherein the processing circuitry is, at periodic intervals, configured to conduct a frequency sweep over a range of frequencies detectable by the antenna assembly and measure a signal strength a plurality of frequencies within the range, and wherein the processing circuitry determines a frequency having a strongest signal strength to tune the antenna assembly to the frequency having the strongest signal strength.

* * * * *